(12) United States Patent
Graham et al.

(10) Patent No.: US 7,735,718 B2
(45) Date of Patent: Jun. 15, 2010

(54) LAYERED PRODUCTS FOR FLUXLESS BRAZING OF SUBSTRATES

(75) Inventors: Michael E. Graham, Evanston, IL (US); Richard A. Hoffman, Export, PA (US); Margaret Anna Hoffman, legal representative, Allison Park, PA (US); Brian E. Cheadle, Brampton (CA); Kostas F. Dockus, Cicero, IL (US); Stefanija Kisielius, legal representative, Cicero, IL (US); Robert H. Krueger, Spring Grove, IL (US)

(73) Assignee: Dana Canada Corporation, Oakville (CA)

( * ) Notice: Subject to any disclaimer, the term of this patent is extended or adjusted under 35 U.S.C. 154(b) by 0 days.

(21) Appl. No.: 12/591,804

(22) Filed: Dec. 2, 2009

(65) Prior Publication Data

US 2010/0086802 A1    Apr. 8, 2010

Related U.S. Application Data

(60) Division of application No. 11/261,914, filed on Oct. 31, 2005, now abandoned, which is a continuation-in-part of application No. 10/300,854, filed on Nov. 21, 2002, now Pat. No. 6,959,853, which is a continuation-in-part of application No. 09/990,507, filed on Nov. 21, 2001, now Pat. No. 6,815,086.

(51) Int. Cl.
*B23K 31/02* (2006.01)
*B32B 15/01* (2006.01)

(52) U.S. Cl. .............................. 228/262.51; 228/262.5; 228/56.3; 228/123.1; 228/183; 228/225; 428/650; 428/654

(58) Field of Classification Search ................ 228/56.3, 228/262.5, 262.51, 123.1, 183, 221, 253; 428/650, 654
See application file for complete search history.

(56) References Cited

U.S. PATENT DOCUMENTS 1,627,900 A    5/1927   Hewitson (Continued)

FOREIGN PATENT DOCUMENTS

EP             587307 B1    12/1996

(Continued)

OTHER PUBLICATIONS

Research Disclosure No. 439070, anonymous disclosure, Kenneth Mason Publications Ltd., published Nov. 2000, pp. 1946-1947.
Standard Recommended Practice for Preparation of and Electroplating on Aluminum Alloys by Zincate Process—American National Standard Institute, Aug. 19, 1974 (Designation: B 253-73).

(Continued)

*Primary Examiner*—Jessica L Ward
*Assistant Examiner*—Devang Patel
(74) *Attorney, Agent, or Firm*—Howrey LLP

(57) ABSTRACT

A brazing product for fluxless brazing comprises a substrate and a filler metal-forming composition applied to the substrate. The substrate preferably comprises aluminum, an aluminum alloy or another metal and may include at least one layer of a ceramic, carbide or nitride. The filler metal-forming composition comprises a liquid-forming layer comprising silicon and a braze-promoting layer comprising one or more metals selected from the group comprising nickel, cobalt, palladium and iron. The liquid-forming layer comprises one or more material layers. Where the liquid-forming layer comprises a plurality of layers, it may include at least one layer consisting essentially of silicon.

30 Claims, 3 Drawing Sheets

U.S. PATENT DOCUMENTS

| | | | |
|---|---|---|---|
| 2,142,564 A | 1/1939 | Korpium |
| 2,745,799 A | 5/1956 | Patrie |
| 2,821,014 A | 1/1958 | Miller |
| 2,937,978 A | 5/1960 | Strauss |
| 3,321,828 A | 5/1967 | Miller |
| 3,332,517 A | 7/1967 | Voser |
| 3,338,725 A | 8/1967 | Banks |
| 3,417,005 A | 12/1968 | Baig |
| 3,482,305 A | 12/1969 | Dockus |
| 3,553,825 A | 1/1971 | Dockus |
| 3,597,658 A | 8/1971 | Rivera |
| 3,675,310 A | 7/1972 | Schwaneke |
| 3,703,763 A | 11/1972 | Berry |
| 3,848,333 A | 10/1974 | Woods |
| 3,970,237 A | 7/1976 | Dockus |
| 3,989,606 A | 11/1976 | Kampert |
| 4,028,200 A | 6/1977 | Dockus |
| 4,040,822 A | 8/1977 | Stern |
| 4,164,454 A | 8/1979 | Schober |
| 4,384,929 A | 5/1983 | Tremmel |
| 4,388,159 A | 6/1983 | Dockus |
| 4,448,853 A | 5/1984 | Fischer |
| 4,451,541 A | 5/1984 | Beal |
| 4,489,140 A | 12/1984 | Pulliam |
| 4,602,731 A | 7/1986 | Dockus |
| 4,785,092 A | 11/1988 | Nanba |
| 4,786,324 A | 11/1988 | Rieger |
| 4,826,736 A | 5/1989 | Nakamura |
| 4,890,784 A | 1/1990 | Bampton |
| 4,901,908 A | 2/1990 | Negura |
| 5,028,495 A | 7/1991 | Hirano |
| 5,044,546 A | 9/1991 | De Clerck |
| 5,069,980 A | 12/1991 | Namba |
| 5,072,789 A | 12/1991 | Usui |
| 5,100,048 A | 3/1992 | Timsit |
| 5,232,788 A | 8/1993 | Timsit |
| 5,316,206 A | 5/1994 | Syslak |
| 5,422,191 A | 6/1995 | Childree |
| 5,464,146 A | 11/1995 | Zaluzec |
| 5,466,360 A | 11/1995 | Ehrsam |
| 5,476,725 A | 12/1995 | Papich |
| 5,594,930 A | 1/1997 | Terada |
| 5,894,054 A | 4/1999 | Paruchuri |
| 6,129,262 A | 10/2000 | Cooper |
| 6,315,188 B1 | 11/2001 | Cadden |
| 6,379,818 B1 | 4/2002 | Mooij |
| 6,383,661 B2 | 5/2002 | Wittebrood |
| 6,391,476 B2 | 5/2002 | Wittebrood |
| 6,503,640 B2 | 1/2003 | Wittebrood |
| 6,528,123 B1 | 3/2003 | Cadden |
| 6,568,584 B2 | 5/2003 | Wittebrood |
| 6,596,413 B2 | 7/2003 | Wittebrood |
| 6,599,645 B2 | 7/2003 | Wittebrood |
| 6,605,370 B2 | 8/2003 | Wittebrood |
| 6,796,484 B2 | 9/2004 | Wittebrood |
| 6,800,190 B1 | 10/2004 | Wilcox |
| 6,913,184 B2 | 7/2005 | Dockus |
| 6,915,964 B2 | 7/2005 | Tapphorn |
| 6,959,853 B2 | 11/2005 | Graham |
| 7,056,597 B2 | 6/2006 | Wittebrood |
| 7,078,111 B2 | 7/2006 | Wittebrood |
| 2001/0040180 A1 | 11/2001 | Wittebrood |
| 2002/0012811 A1 | 1/2002 | Wittebrood |
| 2002/0037425 A1 | 3/2002 | Mooij |
| 2002/0050511 A1 | 5/2002 | Wittebrood |
| 2002/0086179 A1 | 7/2002 | Wittebrood |
| 2002/0088717 A1 | 7/2002 | Wittebrood |
| 2002/0139685 A1 | 10/2002 | Colombier |
| 2002/0168541 A1 | 11/2002 | Palmer |
| 2002/0175205 A1 | 11/2002 | Wittebrood |
| 2003/0064242 A1 | 4/2003 | Wittebrood et al. |
| 2003/0091856 A1 | 5/2003 | Wittebrood |
| 2003/0155409 A1 | 8/2003 | Dockus |
| 2003/0189082 A1 | 10/2003 | Dockus |
| 2003/0197050 A1 | 10/2003 | Graham |
| 2004/0035911 A1 | 2/2004 | Dockus |
| 2004/0038070 A1 | 2/2004 | Dockus |
| 2004/0115468 A1 | 6/2004 | Wijenberg |
| 2004/0131879 A1 | 7/2004 | Wittebrood |
| 2006/0121306 A1 | 6/2006 | Wijenberg |
| 2006/0234082 A1 | 10/2006 | Minami |

FOREIGN PATENT DOCUMENTS

| | | |
|---|---|---|
| EP | 0605323 B1 | 5/2000 |
| EP | 0595601 B2 | 7/2001 |
| FR | 2617868 | 1/1989 |
| GB | 1087054 | 10/1967 |
| GB | 2270086 | 3/1994 |
| JP | 09-300095 | 11/1997 |
| JP | 10-251824 | 9/1998 |
| WO | WO 0071784 A2 | 11/2000 |
| WO | WO 0168312 A2 | 9/2001 |
| WO | WO 0188226 A2 | 11/2001 |
| WO | WO 0207928 A1 | 1/2002 |
| WO | WO 0238321 A1 | 5/2002 |
| WO | WO 0238326 A2 | 5/2002 |

OTHER PUBLICATIONS

B.E. Cheadle and K.F. Dockus, International Congress and Exposition, Detroit, Michigan, Feb. 29-Mar. 4, 1988; SAE Technical Paper Series-Inert Atmosphere Fluxless Brazing of Aluminum Heat Exchangers.

Aluminum Standards and Data 1984, pp. 1-2; 7; 15-21; 29-30.

Aluminum Standards and Data 1997, The Aluminum Associateion, 1996, pp. 6-1-6-6.

Designation: 253-87 (Reapproved 1993), Standard Guide for Preparation of Aluminum Alloys for Electroplating, pp. 48-54.

Durney, Electroplating Engineering Handbook, Fourth Edition, 1984, pp. 185-188; 245; 247-250.

Engstrom et al., A Multilayer Clad Aluminum Material with Improved Brazing Properties, 1988, pp. 222-226.

Finstock and Brazing Products for Heat Exchanger Applications, Alcan.

Golby et al., A Study of the Effect of Pretreatment Procedures on the Plating of Aluminum Alloys, Surface Technology, 12, (1981) 141-155.

Golby et al., Factors Influencing the Growth of Zinc Immersion Deposits on Aluminum Alloys, Transactions of the Institute of Metal Finishing, 1981, vol. 59, pp. 17-24.

Lentz et al., Aluminum Brazing Handbook, Third Edition, 1979, pp. 5-6; 8; 24-33; 36; 58-61; 65-66.

Metal Progress, Mid-June Databook 1980, Properties and Applications of Wrought Aluminum Alloys, pp. 56-57.

Metals and Alloys in the Unified Numbering System, Seventh Edition, 1996, pp. 31-35; 42; 44.

Pearson et al., Improvements in the Pretreatment of Aluminum as a Substrate for Electrodeposition, Trans IMF, 1997, 75(3), pp. 93-97.

Such et al., An Improvement in Zincate Method for Plating on Aluminum, 1965, pp. 1027-1034.

The Coil which Goes Around the World Technical Data.

Van Horn, Aluminum, vol. 1 Properties, Physical Metallurgy and Phase Diagrams, 1987, pp. v; 48-55; 162-165; 178-179; 192-209; 300-303.

Wernick et al., The Surface Treatment and Finishing of Aluminum and its Alloys, Fifth Edition, vol. 1, 1987, pp. III-v; xxx-xxxi; 180-183; 190-203.

Wernick et al., The Surface Treatment and Finishing of Aluminum and its Alloys, Fifth Edition, vol. 2, 1987, pp. 1023-1083.

Wyszynski, An Immersion Alloy Pretreatment for Electroplating on Aluminum, Transactions of the Institute of Metal Finishing, 1967, vol. 45, pp. 147-154.

Wyszynski, Electrodeposition on Aluminum Alloys, Transactions of the Institute of Metal Finishing, 1980, vol. 58, pp. 34-40.

LAYERED PRODUCTS FOR FLUXLESS BRAZING OF SUBSTRATES

CROSS-REFERENCE TO RELATED APPLICATIONS

The present application is a divisional of U.S. application Ser. No. 11/261,914, filed Oct. 31, 2005, which is abandoned; which is a continuation-in-part of U.S. patent application Ser. No. 10/300,854, filed Nov. 21, 2002, which issued as U.S. Pat. No. 6,959,853 on Nov. 1, 2005; which is a continuation-in-part of U.S. patent application Ser. No. 09/990,507, filed Nov. 21, 2001, which issued as U.S. Pat. No. 6,815,086 on Nov. 9, 2004. The above applications and patents are hereby incorporated by reference in their entirety.

FIELD OF THE INVENTION

The invention relates to the modification of substrates for the purpose of rendering the substrates brazeable in the absence of a brazing flux.

BACKGROUND OF THE INVENTION

Various methods of bonding substrates are known in the prior art. One bonding method which is used extensively in the manufacture of heat exchanger assemblies is furnace brazing, most commonly by Controlled Atmosphere Brazing (CAB) and Vacuum Brazing (VB). Heat exchanger assemblies are characterized by a plurality of thin aluminum components which are bonded together by brazing. At least some of these components may be comprised of an aluminum brazing sheet having an aluminum or aluminum alloy core layer provided on one or both sides with an aluminum-silicon cladding layer. The cladding layer has a lower melting point than the core layer and melts during brazing to form a filler metal which flows into the voids between the components and solidifies on cooling, thereby bonding the components together.

Because sophisticated rolling mill practices are required to produce aluminum-silicon clad brazing sheet, this composite is more costly than conventional flat rolled sheet and strip. Also, available alloy compositions are limited by mill product standardization, by casting limitations, or by scrap recovery considerations that affect the economy of the overall casting or mill operation.

Conventional brazing alloys can be brazed in the absence of a brazing flux when at least one additional layer of a braze-promoting metal such as nickel, cobalt or iron is applied to the brazing sheet. Such braze-promoting layers are usually applied by electroplating, for example as disclosed in U.S. Pat. No. 4,028,200. If properly applied, the braze-promoter reacts exothermically with the underlying aluminum-silicon cladding alloy, and is believed to disrupt the aluminum oxide layer to permit the underlying aluminum metal to flow together and join. However, there are environmental hazards and liabilities associated with prior art wet electroplating systems for deposition of fluxless braze promoters. Furthermore, there are limitations on the range of material strip or component dimensions which can be electroplated in high volume production. For example, the constraints of fixed size plating cells limit the maximum plateable strip width.

There remains a need for layered products for fluxless brazing of substrates which overcome the problems described above which limit the usefulness of presently known fluxless brazing products.

SUMMARY OF THE INVENTION

In one aspect, the present invention provides a brazing product for fluxless brazing, comprising: (a) a substrate; and (b) a filler metal-forming composition applied to the substrate. The filler metal-forming composition forms a liquid filler metal when the brazing product is heated to a brazing temperature. The filler metal-forming composition comprises: (i) a liquid-forming layer comprising silicon, wherein the silicon content of the liquid-forming layer is from about 20 to 100 percent by weight; and (ii) a braze-promoting layer comprising one or more metals selected from the group comprising nickel, cobalt, palladium and iron.

In another aspect, the present invention provides a brazing product for fluxless brazing, comprising: (a) a substrate; and (b) a filler metal-forming composition applied to the substrate. The filler metal-forming composition forms a liquid filler metal when the brazing product is heated to a brazing temperature. The filler metal-forming composition comprises: (i) a liquid-forming layer comprising silicon, wherein the liquid-forming layer comprises one or more material layers, and wherein at least one of said material layers consists essentially of silicon; and (ii) a braze-promoting layer comprising one or more metals selected from the group comprising nickel, cobalt, palladium and iron.

DETAILED DESCRIPTION OF PREFERRED EMBODIMENTS

Figure 1:
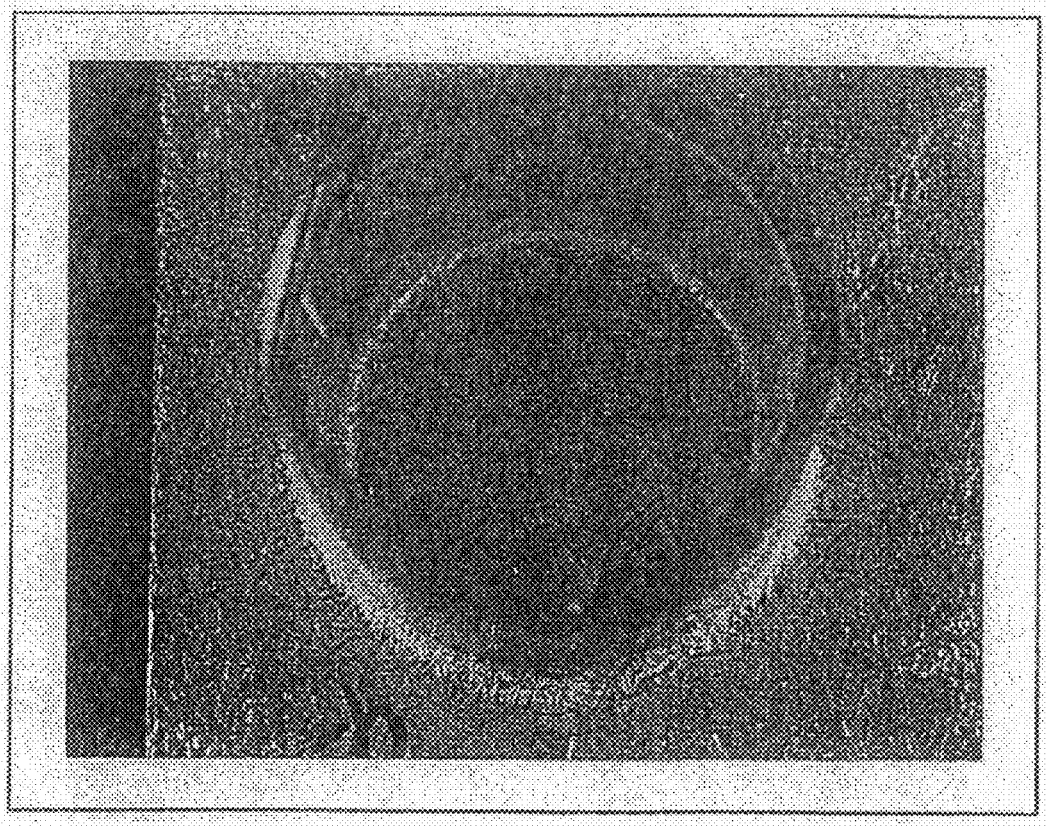
FIGS. 1 to 3 are photographs illustrating a brazed assembly according to a preferred embodiment of the invention.

The present invention provides an in-situ filler metal forming material system that may eliminate the need for separately clad filler metal (or separately provided, for example as performs, etc.), while maintaining a fluxless brazing method. The present invention also provides an adjustable material braze system, so that for example, braze fillet size or fluidity may be adjusted according to the product requirements, or on different parts of the same product, for example opposite sides of the same brazing sheet.

The inventors have also recognized that such a system can be applied to provide a range of filler metal compositions so that both low braze temperatures and normal Al—Si braze temperatures may be achieved in a fluxless format. The ability to tailor the material system (filler metal and braze promoters along with braze modifiers, bonding layers, and temperature modifiers) provides significantly increased flexibility in application to aluminum alloy systems that are either not now brazeable, or not available in forms suitable for brazing. These include, for instance, high alloy content 7xxx, 2xxx, 6xxx or 8xxx series aluminum, or aluminum castings and die-castings. Specific alloys to which a silicon liquid-forming layer has been applied include 3003, 5052 (2.8% Mg) and 1100 alloys. The adjustable braze response characteristics are applicable to demanding product applications, such as internal joints of heat exchangers, or brazing of intricate flow field channels formed in metal plate fuel cell engines.

The inventors have developed deposition methods and layered brazing products, as well as ancillary methods to enable the practical achievement of "dry" material cleaning methods to allow preferred inline deposition processes. Successfully demonstrated dry cleaning techniques such as plasma or ion-cleaning are important steps in minimizing the environmental impact of the brazing process, and have been demonstrated to be practical as well.

The fluxless brazing products according to the invention begin with a substrate, which may preferably include at least one layer comprised of pure aluminum or any aluminum alloy; at least one layer comprised predominantly of a metal other than aluminum, hereinafter referred to as a "dissimilar metal"; or at least one layer comprised of a ceramic, carbide or nitride material. In addition, the substrate may comprise any of the materials specifically disclosed in U.S. Pat. No. 6,815,086 and U.S. Publication No. 2003/0155409, incorporated herein by reference in their entireties.

The substrate preferably includes a layer of a metal selected from the group comprising aluminum, an aluminum alloy and a dissimilar metal. This layer forms an outermost layer of the substrate upon which the other layers of the product, described below, are deposited. Specific examples of substrates are now discussed in greater detail below.

Where the substrate includes at least one layer comprised of an aluminum alloy, the alloy can comprise a conventional aluminum alloy employed in brazing such as AA3xxx-series alloys, or may comprise other alloys such as AA1xxx, AA2xxx, AA4xxx, AA5xxx, AA6xxx, AA7xxx and AA8xxx-series alloys or aluminum casting alloys. Examples of specific aluminum alloy substrates include AA1xxx-series aluminum alloys such as AA1100, AA3xxx-series aluminum alloys such as AA3003, as well as AA5xxxx and AA6xxx series aluminum alloys. In the case of 5xxx or 6xxxx-series aluminum alloys, which contain 1 or 2% or even 3% magnesium, the diffusion of magnesium from the core into the coating may be exploited to assist in the braze reaction, provided that a coating system using nickel as a topcoat braze promoter is employed. The small amounts of magnesium that can diffuse into the liquid filler metal during brazing may assist the braze-promoting reaction of nickel in this case, since magnesium itself is a braze promoter and the inventors have discovered that the use of nickel braze promoters can provide a synergistic benefit with materials containing small amounts of magnesium.

Dissimilar metals for use in the substrate include one or more of the following: copper and copper alloys such as bronze and brass; titanium and titanium alloys; steels such as high strength steel, low carbon steel, stainless steel, and nickel alloy steel; and nickel and nickel alloys. These dissimilar metals may preferably be coated with aluminum, nickel or titanium. For example, copper and copper alloys may preferably be coated with aluminum, titanium, or alloys of aluminum or titanium; and steels may preferably be coated with nickel or alloys thereof.

The substrate may include one or more layers of a ceramic, carbide or nitride material. Examples of ceramics include alumina and zirconia. An example of a carbide is silicon carbide and an example of a nitride is silicon nitride. These materials may form part of a layered structure, for example in combination with one or more layers of aluminum, aluminum alloys, steel, or composite materials. Examples of this type of substrate are described in U.S. Pat. No. 4,602,731 issued on Jul. 29, 1986 to Dockus, which is incorporated herein by reference in its entirety.

In the case of substrates containing large amounts of alloying elements, such elements might be expected to diffuse to the surface during brazing and have deleterious effects. As discussed in greater detail below, these substrates can be exploited according to the invention by depositing or providing suitable barrier coatings, which may include aluminum or titanium, etc. In highly-alloyed aluminum substrates such as high zinc 7xxx, or aluminum-lithium 2xxx or 8xxx alloys, a suitable low temperature filler metal system may be needed to accommodate the depressed melting temperature ranges of these alloyed materials.

In the products according to the present invention, a filler metal-forming composition is applied on top of the substrate, and is preferably applied on top of an outermost metal layer of the substrate. The filler metal-forming composition is comprised of a liquid-forming layer and a braze-promoting layer. The filler metal-forming composition, and specifically the liquid-forming layer, forms a liquid filler metal when the brazing product is heated to a brazing temperature. It will be appreciated that the substrate may also participate to some extent in the formation of the filler metal, although this is not necessarily the case. For example, the substrate may combine with the liquid-forming layer to form a liquid filler metal having a melting temperature lower than that of the substrate. Therefore, where the metal substrate comprises aluminum or an aluminum alloy, the liquid-forming layer is preferably comprised of at least one element which forms a eutectic with aluminum, most preferably silicon. As further discussed below, the provision of a barrier coating between the substrate and the liquid-forming layer may prevent the substrate from participating to any significant extent in the formation of the filler metal.

The liquid-forming layer preferably comprises from about 20 to 100 percent by weight silicon. More preferably, the lower limit of silicon content in the liquid-forming layer is about 30 percent by weight, and even more preferably about 50 percent by weight. The content of silicon in the liquid-forming layer may for example be from about 90 to about 100 percent by weight. Moreover, the liquid-forming layer preferably forms the bulk of the filler metal-forming composition, such that above-stated compositions of the liquid-forming layer generally apply also to the filler metal-forming composition as a whole.

The liquid-forming layer may comprise a single material layer or may preferably comprise a plurality of material layers of the same or different composition. According to one preferred embodiment of the invention, the liquid-forming layer is comprised of at least one material layer which is comprised of at least 50 percent by weight silicon. More preferably, the liquid-forming layer is comprised of at least one material layer which consists essentially of silicon, preferably having a silicon content in an amount from about 90 to 100 percent by weight, more preferably from about 95 to 100 percent by weight.

The overall thickness of the liquid-forming layer can be varied within a broad range, and is typically from less than about 1 μm to about 50 μm or higher. In some preferred embodiments of the invention, the thickness of the liquid-forming layer is from about 1 μm to about 30 μm, and is typically in the range from about 3 μm to about 20 μm, for example about 5 μm to 10 μm.

The individual material layers making up the liquid-forming layer and the filler metal-forming composition, including silicon-containing layers, may preferably be deposited by physical vapor deposition (PVD) in one or more steps, although it may be preferred to use other source options, as further discussed below. PVD is understood to include sputtering, including magnetron sputtering; electron beam (EB) evaporation; and cathodic arc deposition. For practical benefits such as rates of deposition, EB coating methods are preferred. Cathodic arc is another commercial PVD system, which may be suitable for certain metals.

In preparing layered products according to the present invention, it may be preferred to use a combination of source types, depending on the specific metals being deposited. For example, EB-evaporation is likely best for silicon, but may or may not be best for other metals such as lead or bismuth. However, comparatively little lead is required, so a sputtered rate may be acceptable, and more efficient use of the lead might be possible. Nickel or other metals such as palladium likewise do not require much thickness and other source options might be possible, although EB-evap may still be preferred. Sputtering of top layers may help to hold temperature of the sheet down and it puts less material on the chamber walls and more on the substrate. Other source options include electroplating, electroless plating, roll bonding, thermal spraying, kinetic energy metallization (KEM), continuous casting, plasma spraying, and chemical vapor deposition (CVD) or other techniques for depositing metals or metal alloys from a gas or vapor phase, although some of these methods may be impractical or difficult to control for some substrates.

In preferred embodiments of the invention where a silicon coating serves as the liquid-forming layer, the thickness of the silicon coating will preferably be from about 3 to about 20 microns, more preferably from about 5 to about 10 microns, when combined with the braze promoters described below. Where braze promoters are not used, a thicker silicon coating may be necessary to obtain equivalent braze quality; equivalent braze quality may be unachievable; or a brazing flux may become a necessary compensator. Similarly, in combination with other eutectic formers it may be possible to use thinner silicon coatings; however it may be preferred that a silicon layer of about 1 micron is in contact with the nickel braze promoter.

The coated substrate is provided with one or more additional coatings comprised of braze promoters and optional braze modifiers, usually after formation of the liquid-forming layer. An extremely thin (from <5 nm to about 50 nm) layer of braze modifier is preferably deposited at the interface of the liquid-forming layer and the braze-promoting layer. Preferred braze modifiers are selected from the group comprising bismuth, lead, lithium, antimony, magnesium, strontium and copper. Bismuth and lead are preferred where the liquid-forming layer comprises silicon and the braze-promoting layer is nickel-based. The braze modifier acts as a wetting agent which enhances the wetting and spreading characteristics of the filler metal.

Too thick a layer of braze modifier may interfere with contact of the braze-promoting and liquid-forming layers. It may instead be preferred to locate the braze-modifier layer at the interface between the aluminum substrate and the liquid-forming layer, although it can interfere with adhesion of the liquid-forming layer to the substrate. For example, where the liquid-forming layer comprises silicon, an excessively thick braze modifier layer can cause peeling of the liquid-forming layer in some cases due to heat transfer to the aluminum substrate during deposition of the silicon, or due to the time of exposure to the electron-beam source, associated radiation from the vapor cloud, and the heat of condensation of the silicon vapor on the substrate. To prevent this, it may be preferred to apply the silicon and/or other elements making up the liquid-forming layer as a plurality of discrete material layers, with a cooling phase between the deposition of each layer. In addition, provision may be made for substrate cooling during coating, for example by contact with chilled surfaces on the back side of the sheet being coated, which is limited by thermal transfer of materials, contact time and geometry.

Where lithium is used as a braze modifier, it may be added to replace or supplement another braze modifier such as lead, bismuth or antimony. Lithium may preferably be deposited in an alloyed form, such as aluminum-lithium, due its extreme reactivity, and is preferably present as an extremely thin aluminum-lithium layer which may be located underneath or on top of the liquid-forming layer, but below the upper-most braze promoter. If antimony is deposited it may similarly be deposited as an alloy with aluminum or zinc, or as a constituent of a zinc-aluminum or aluminum-zinc alloy.

Preferred braze promoters include those described in U.S. Pat. No. 6,815,086 and U.S. Publication No. 2003/0155409. For example, the braze-promoting layer preferably comprises one or more metals selected from the group comprising nickel, cobalt, iron and palladium. More preferably, the braze-promoting layer is nickel-based, and may preferably comprise pure nickel or nickel in combination with one or more alloying elements and/or impurities selected from the group comprising cobalt, iron, lead, bismuth, magnesium, lithium, antimony and thallium. Particularly preferred alloying elements include the braze modifiers bismuth, lead, antimony and thallium. Specific examples of nickel-based braze-promoting layers are nickel, nickel-bismuth, nickel-lead, nickel-cobalt, nickel-iron, nickel-bismuth-cobalt, nickel-lead-cobalt, nickel-lead-bismuth and nickel-bismuth-antimony, with the elements making up the braze promoting layer being listed in descending order according to their relative amounts.

In some preferred embodiments of a nickel-based braze-promoting layer, lead and/or bismuth are present in an amount of up to about 10%, preferably up to about 5%, and more preferably up to about 3%, although lower amounts and even trace amounts of these elements may also have a beneficial effect. For example, amounts of lead or bismuth as low as up to about 1.0%, about 0.01 to 1.0%, or about 0.01 to 0.05% may be beneficial.

The braze-promoting layer may be applied by electroplating, electroless plating, roll bonding, thermal spraying, plasma spraying, KEM, continuous casting, CVD, PVD or other techniques for depositing metal or metal alloys from a gas or vapor phase, subject to the above comments that some of these methods may be impractical or difficult to control. Electroplating using the conditions and plating baths disclosed in U.S. Pat. No. 6,815,086, U.S. Publication No. 2003/0155409 and U.S. Pat. No. 4,028,200 (incorporated herein by reference in its entirety) is a preferred method for applying the braze-promoting layer to the coated substrate. Preferred electroplating solutions utilized in the plating of the braze promoting layers include solutions of nickel sulfate, nickel chloride, sodium citrate, sodium gluconate, sodium acetate, ammonium chloride, ammonium sulfate, ammonium hydroxide and lead acetate.

The braze-promoting layer preferably has a thickness of up to about 2.0 microns, more preferably up to about 1.0 microns, even more preferably up to about 0.5 microns, for example about 0.05 to 0.5 microns. A preferred minimum thickness of the braze-promoting layer is about 0.25 to 0.30 microns.

The braze-promoting layer typically has a thickness which is considerably less than that of the liquid-forming layer such that the braze-promoting layer makes up a minor, albeit important, component of the filler metal. In most situations, the braze-promoting layer has a thickness which is from about 1 percent to about 25 percent of the thickness of the liquid-forming layer, and which is typically from about 3 to about 10 percent of the thickness of the liquid-forming layer. In terms of weight percent, the braze-promoting layer preferably comprises less than 25 percent by weight of the filler metal-forming layer, preferably less than 10 percent by weight, and may preferably comprise from about 1-4 percent by weight of the filler metal-forming layer.

In order to promote adhesion of the liquid-forming layer to the substrate, a thin bonding layer may preferably be applied at the interface of the substrate and the liquid-forming layer. For example, where the liquid-forming layer comprises silicon (optionally in combination with aluminum), a thin layer of aluminum, silicon, zinc or a zinc-aluminum alloy having a thickness of not more than about 1 micron is preferably applied at the interface of the substrate and the liquid-forming layer. Where the bonding layer contains zinc, the zinc may preferably be pre-alloyed with antimony or magnesium.

The brazing product according to the invention may further comprise a thin, transient barrier coating which is preferably applied at the interface between the substrate and the liquid-forming layer or at the interface between the substrate and the braze-modifier layer. It is believed that the barrier coating acts to temporarily restrict diffusion of the filler metal (comprised of all layers deposited on the substrate) to temporarily restrict diffusion of elements from the filler metal into the aluminum substrate; or to limit diffusion of potentially deleterious elements from highly alloyed substrates into the liquid filler metal.

The barrier coating preferably comprises one or more metals selected from nickel, titanium, tantalum, copper, niobium, tin, lead, bismuth and aluminum. More preferably, the barrier coating is comprised of nickel, nickel-lead or nickel-bismuth. Barrier coatings comprising copper, copper-lead or copper-bismuth may also be preferred in some embodiments, either in addition to, or in substitution for, the nickel-based barrier coating. The barrier coating can preferably be applied by electroless or electrolytic plating.

After application of the barrier coating, topcoats of braze modifiers and/or braze promoters would be applied as above. During brazing, the barrier coating is eventually consumed so that eventual alloying with the aluminum core may occur, while permitting most of the liquid filler metal to remain liquid to effect the braze joint. If the barrier coating is required to prevent migration of species from the substrate into the liquid-forming layer or vice versa, the liquid-forming layer will need to be provided with additional material layers so that it can form its own liquid without access to the substrate, and a thicker or more resistant barrier coating may then be used.

In one preferred embodiment of the invention, the liquid-forming layer comprises silicon in combination with aluminum. According to this embodiment, the substrate is coated with an alloy containing silicon and aluminum (eg. aluminum-silicon or silicon-aluminum) or sequential thin layers of aluminum and silicon are deposited to create a desired composition of filler metal. Experiments suggest that a thin, initial layer of aluminum or silicon, having a thickness of not more than about 1 micron, is preferred for adhesion of liquid-forming layers comprised of silicon and aluminum, as well as for those comprised predominantly or entirely of silicon. Similarly, a thin layer of silicon is preferably applied immediately under the subsequently applied braze modifier or braze promoter. A benefit of the sequential thin-layered approach is that heating and the stress build-up in the coating from the rate-determining silicon deposition step is reduced. A thin layer of zinc, or an aluminum-zinc alloy, may be substituted for the 1 micron preferred Al or Si bonding layer or interlayer.

In another preferred embodiment of the invention, a silicon and aluminum-containing liquid-forming layer is deposited as a pre-formed alloy of silicon and aluminum, for example an aluminum-silicon or silicon-aluminum alloy, wherein the elements making up the liquid-forming layer are listed in descending order according to their relative amounts. Where a pre-formed alloy is being used, it may be preferable to deposit a hypereutectic composition, ie in the range 12-20 percent by weight silicon, or preferably greater than 20 percent by weight silicon, with suitable provisions made to compensate for unequal deposition rates of the two-phase alloy. It will be appreciated that other alloy additions such as magnesium or copper may be added to the alloy to achieve ternary or quaternary, etc., alloy compositions. In an alternate embodiment, zinc, zinc-aluminum or aluminum-zinc may be deposited in conjunction with the silicon coating, and the zinc may be preallamped with antimony or magnesium.

In yet another preferred embodiment of the invention, a layer of zinc, zinc-aluminum or aluminum-zinc is provided in addition to a liquid-forming layer comprising silicon and the braze promoters. This additional layer may preferably be located underneath the liquid-forming layer or immediately on top of it. Alternatively, the silicon of the liquid-forming layer could be pre-alloyed with zinc, zinc-aluminum or aluminum-zinc. The use of lead or bismuth as braze modifiers and the use of nickel braze-promoting layers may enhance the performance of these alloys.

Example 1

The method according to the invention was applied as follows:

Substrate: AA3003 plate (coupon), AA3003 tube.

Cleaning method: caustic cleaned plate; i.e. etch, rinse, desmut, rinse, dry.

Coating sequence: 3.4 μm Al/0.9 μm Si/3.4 μm Al/0.9 μm Si/3.4 μm Al/1.25 μm Si/0.005 μm Pb/1.5 μm Ni.

Braze Quality Very Good (Good to excellent based on 4 samples run per test)

Purpose of this coating sequence: 1) to deposit an aluminum-silicon alloy on the surface of the substrate, using a sequential layer approach. This approach reduces stress in each coating layer, and theoretically reduces reaction distance between silicon and aluminum, for melting. It was found that as far as brazing goes, it does not make much difference whether aluminum and silicon are applied in sequence, or just one layer of silicon in contact with the aluminum Substrate, as long as the silicon layers are not too thick.

Preferably, the last layer deposited is silicon, then a very thin layer of braze modifier (preferably lead or bismuth) is applied, followed by the braze promoter, preferably nickel. This is a particularly preferred embodiment. Furthermore, it is preferred that the nickel be essentially in contact with the silicon, such that the very thin layer of lead or bismuth does not degrade contact between the nickel and silicon, and in fact it is speculated that the low melting bismuth or lead may actually improve contact during brazing.

Figure 2:
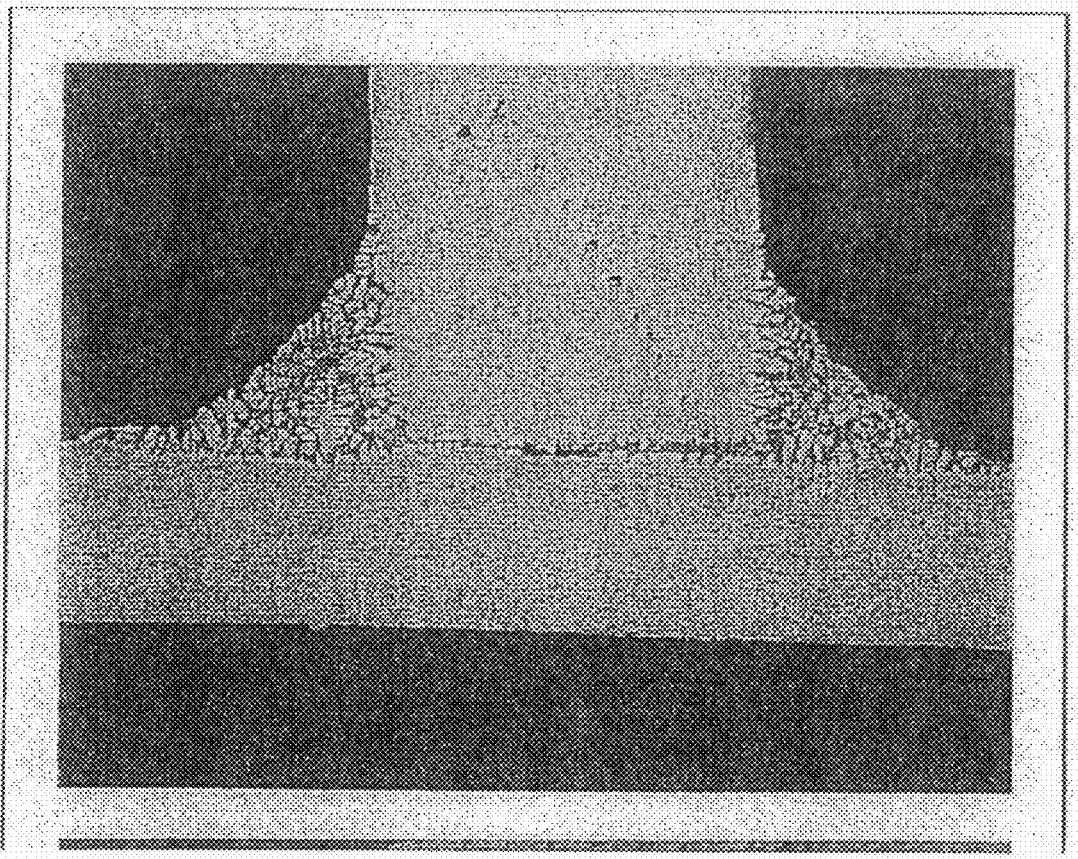
Figure 3:
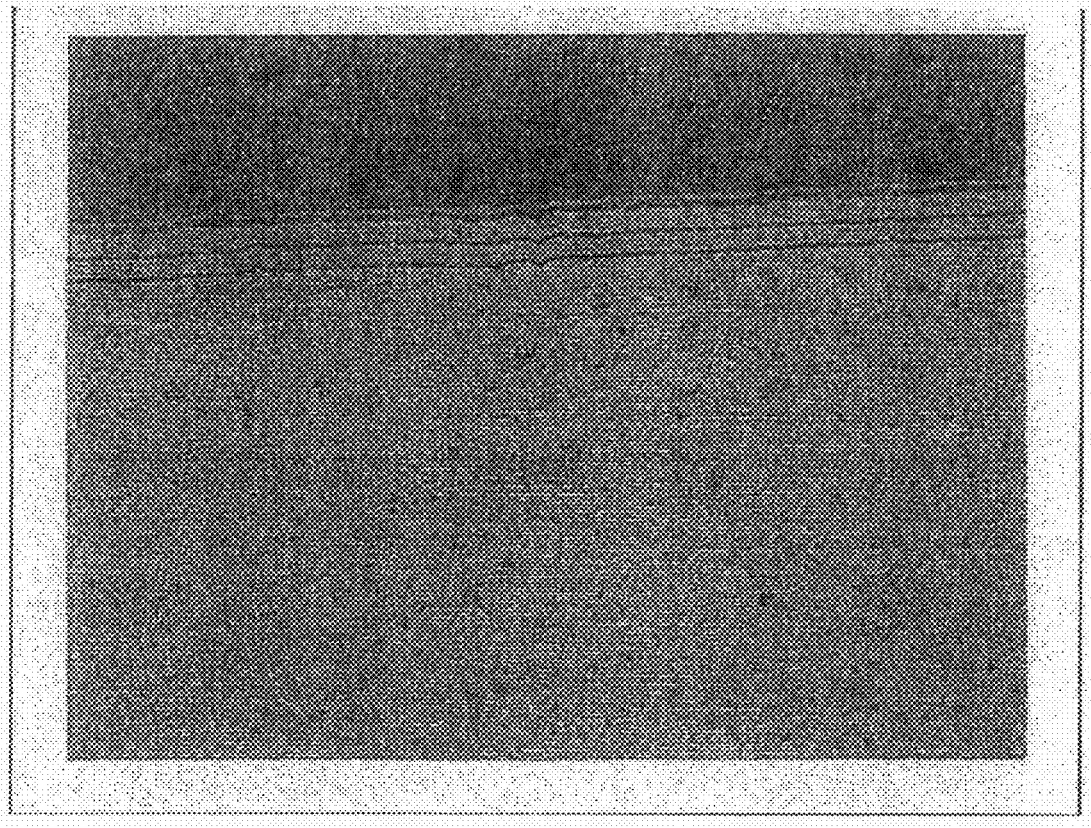

FIG. 1 illustrates the brazed plate and tube combination, at a magnification of 3-4×. The tube is 0.75" in diameter. FIG. 2 illustrates a cross-section through the tube wall to plate joint, at a magnification of 38×. There is excellent wetting and fillet formation from the in-situ formed eutectic. FIG. 3 illustrates a cross-section of the layered deposit, in the as-deposited condition, i.e. prior to braze. It is possible to resolve the individual layers shown in FIG. 3, with nickel on the outermost (upper) surface.

EB Examples 2-12

Coating of the substrates was carried out by pretreating approximately 4"×4" coupons of the target substrate through various means including (a) solvent degreasing, (b) caustic cleaning, whereby the coupon is immersed in 10% Oakite 360 etch solution for approximately 45 seconds, tap water rinsed, deoxidized in Oakite 125 for 10 seconds, tap water rinsed and dried, (c) mechanical brush cleaned with 3M 7A brushes, (d) sputtering with an inert gas in vacuum, (e) ion etching. Multilayer coatings were applied to the target surface through electron beam physical vapour deposition of variously prepared sources. The coupons were divided into four approximately equal samples and assessed through brazing.

Coating thicknesses were assessed using a deposition rate detector as well as microscopic (SEM) assessment of metallurgical sections.

Braze tests were carried out to demonstrate the effectiveness of the coating on a target substrate sheet. In each test, braze quality was determined by placing the flat, cut end of an AA3003 O-temper aluminum tube [0.65" ID×0.75" OD, cut to 0.5" length and ground flat on a 1.5"×1.5" coupon of target substrate sheet and heating the arrangement in a preheated furnace in a flowing nitrogen atmosphere to approximately 1100° F. for a dwell time of approximately 1 minute at maximum temperature. Braze quality was reported as excellent, very good, good, fair and poor based on visual attribute data such as fillet size, wetting characteristics, surface appearance, lustre, etc.

Example 2

AA5052 sheet samples were prepared through (a) sputter cleaning and (b) mechanical brushing followed by deposition of 16 μm silicon to the target interface, incremental deposition to the newly formed surface of 0.03 μm lead then 1 μm nickel. The coated sheet samples were subdivided into four coupons each for individual braze assessment. Both sets of coupons exhibited an excellent braze.

Example 3

An AA3003 sheet sample was prepared through caustic etching followed by deposition of 16 μm silicon to the target interface, incremental deposition to the newly formed surface of 0.03 μm lead then 1.0 μm nickel. The coated sheet sample was subdivided into four coupons for individual braze assessment. All coupons exhibited an excellent braze.

Example 4

An AA3003 sheet sample was prepared through caustic etching followed by deposition of 16 μm silicon to the target interface, incremental deposition to the newly formed surface of 0.037 μm bismuth then 1.0 μm nickel. The coated sheet sample was subdivided into four coupons for individual braze assessment. Three coupons exhibited an excellent braze, while one exhibited a good braze.

Example 5

AA3003 sheet samples were prepared through ion etching for (a) 20 minutes, (b) 30 minutes followed by deposition of 16 μm silicon to the target interface, incremental deposition to the newly formed surface of 0.03 μm lead then 1.0 μm nickel. The coated sheet samples were subdivided into four coupons for individual braze assessment. The 20 minute etched coupons exhibited two excellent and two good brazed samples. The 30 minute etched coupons exhibited three excellent and one good braze.

Example 6

An AA3003 sheet sample was prepared through caustic etching followed by deposition of 28 μm silicon to the target interface, incremental deposition to the newly formed surface of 0.03 μm lead then 1.0 μm nickel. The coated sheet sample was subdivided into four coupons for individual braze assessment. All coupons exhibited an excellent braze.

Example 7

AA3003 sheet samples were prepared through caustic etching followed by deposition of 6 μm silicon to the target interface, incremental deposition to the newly formed surface of 0.03 μm lead then (a) 0.05 μm nickel on one sheet and (b) 1.0 μm nickel on the second. The coated sheet samples were subdivided into four coupons for individual braze assessment. The 0.05 μm coupons exhibited two excellent and two good brazed samples. The 1.0 μm coupons all exhibited an excellent braze.

Example 8

AA3003 sheet samples were prepared through caustic etching followed by deposition of 16 μm silicon to the target interface, incremental deposition to the newly formed surface of (a) no lead or nickel on the first and (b) 0.03 μm lead then 1.0 μm nickel on the second. The coated sheet samples were subdivided into four coupons for individual braze assessment. The non-lead/nickel coupons exhibited two good, one fair and one poor brazed sample. The lead-containing sample exhibited two excellent and two good samples.

Example 9

AA3003 sheet samples were prepared through caustic etching followed by incremental deposition of alternating layers of aluminum and silicon as follows 2.0 μm Al, 1.8 μm Si, 4.0 μm Al, 1.8 μm Si, 4.0 μm Al, 1.75 μm Si μm to the target interface and subsequent deposition to the newly formed surface of (a) 0.05 μm nickel and (b) 0.01 μm lead then 0.5 μm nickel. The coated sheet samples were subdivided into four coupons for individual braze assessment. Three of the non-leaded samples exhibited a fair braze and one sample exhibited a poor braze. The leaded samples all exhibited an excellent braze.

Example 10

An AA3003 sheet sample was prepared through caustic etching followed by deposition of 10 μm zinc to the target interface, incremental deposition to the newly formed surface of 0.25 μm nickel. The coated sheet sample was subdivided into four coupons for individual braze assessment. All coupons exhibited fair braze.

Example 11

An AA3003 sheet sample was prepared through caustic etching followed by deposition of 25 μm zinc to the target interface, incremental deposition to the newly formed surface of 0.5 μm silicon and 0.25 μm nickel. The coated sheet sample was subdivided into four coupons for individual braze assessment at 1100° F. Three coupons exhibited a good braze. Two coupons of the same composition were brazed at 1000° F. and exhibited a good braze.

Example 12

An AA3003 sheet sample was prepared by a novel combination of ion cleaning with oxygen for 3 minutes followed by a 30 minute ion etch then deposition of 5 μm silicon to the target interface, incremental deposition to the newly formed surface of 0.03 μm lead then 1.0 μm nickel. The coated sheet sample was subdivided into four coupons for individual braze assessment. All coupons exhibited a very good braze.

Although the invention has been described in connection with certain preferred embodiments, it is not limited thereto. Rather, the invention includes all embodiments which may fall within the scope of the following claims.

What is claimed is:

1. A brazing product for fluxless brazing, comprising:
   (a) a substrate comprising aluminum or an aluminum alloy; and
   (b) a filler metal-forming composition applied to the substrate, wherein the filler metal-forming composition forms a liquid filler metal when the brazing product is heated to a brazing temperature, and wherein the filler metal-forming composition comprises:
      (i) a liquid-forming layer comprising a plurality of material layers consisting of aluminum and a plurality of material layers consisting of silicon, wherein the aluminum and silicon layers are arranged in alternating order within the liquid-forming layer; and
      (ii) a braze-promoting layer comprising one or more metals selected from the group comprising nickel, cobalt, palladium and iron.

2. The brazing product according to claim 1, wherein the liquid-forming layer is applied on top of the substrate and the braze-promoting layer is applied on top of the liquid-forming layer.

3. The brazing product according to claim 1, wherein the substrate comprises at least one layer of said aluminum alloy, and wherein said aluminum alloy is selected from the group consisting of AA1xxx, AA2xxx, AA3xxx, AA4xxx, AA5xxx, AA6xxx, AA7xxx and AA8xxx-series alloys, and aluminum casting alloys.

4. The brazing product of claim 3, comprising an aluminum brazing sheet or an aluminum casting clad with said filler metal-forming composition.

5. The brazing product of claim 1, wherein the substrate comprises at least one layer of a dissimilar metal selected from the group consisting of copper, copper alloys such as bronze and brass, high strength steel, low carbon steel, stainless steel, nickel alloy steel, titanium and titanium alloys.

6. The brazing product of claim 5, wherein said dissimilar metal layer is selected from the group consisting of copper, copper alloys, high strength steel, low carbon steel, stainless steel, nickel alloy steel, and wherein the dissimilar metal layer is coated or plated with a metal selected from the group consisting of aluminum, titanium and nickel.

7. The brazing product of claim 1, wherein the substrate includes at least one layer comprising a ceramic, a carbide or a nitride.

8. The brazing product of claim 1, wherein the liquid-forming layer has a thickness of from about 1-50 μm.

9. The brazing product of claim 1, wherein the liquid-forming layer has a thickness of from about 1-30 μm.

10. The brazing product of claim 1, wherein the liquid-forming layer has a thickness of from about 10-20 μm.

11. The brazing product of claim 1, wherein the liquid-forming layer has a thickness of from about 5-10 μm.

12. The brazing product of claim 1, wherein the liquid-forming layer comprises from 30 to 90 percent by weight silicon.

13. The brazing product of claim 1, wherein the liquid-forming layer comprises from 50 to 90 percent by weight silicon.

14. The brazing product of claim 1, wherein an outermost one of said alternating layers, which is applied directly under the braze-promoting layer, comprises silicon.

15. The brazing product of claim 14, wherein said outermost silicon layer has a thickness of about 1 μm.

16. The brazing product of claim 1, wherein the braze-promoting layer comprises nickel.

17. The brazing product of claim 16, wherein the braze-promoting layer further comprises one or more alloying elements selected from the group comprising cobalt, iron, lead, bismuth, magnesium, lithium, antimony and thallium.

18. The brazing product of claim 16, wherein the braze-promoting layer comprises a nickel-based alloy selected from the group consisting of nickel-bismuth, nickel-lead, nickel-cobalt, nickel-bismuth-cobalt, nickel-lead-cobalt, nickel-lead-bismuth and nickel-bismuth-antimony.

19. The brazing product of claim 1, wherein the braze-promoting layer has a thickness of 0.05 to about 1.0 microns.

20. The brazing product of claim 1, wherein the filler metal-forming composition further comprises a braze modifier layer located at an interface between the liquid-forming layer and the braze-promoting layer or at an interface between the substrate and the liquid-forming layer, wherein the braze modifier layer comprises one or more metals selected from the group consisting of bismuth, lead, lithium, antimony, magnesium, strontium and copper.

21. The brazing product of claim 20, wherein the braze modifier layer has a thickness of from about 5 to 50 nanometers.

22. The brazing product of claim 20, wherein the braze-promoting layer comprises nickel and wherein the braze modifier layer comprises bismuth or lead.

23. The brazing product of claim 20, wherein the braze modifier layer comprises lithium which is deposited in the form of an aluminum-lithium alloy.

24. The brazing product of claim 20, wherein the braze modifier layer comprises antimony which is deposited in the form of an alloy with aluminum or zinc.

25. The brazing product of claim 1, wherein the filler metal-forming composition further comprises a bonding layer which is located at an interface between the substrate and the liquid-forming layer, and wherein the bonding layer comprises one or more elements selected from the group consisting of aluminum, zinc and silicon.

26. The brazing product of claim 25, wherein the bonding layer has a thickness of about 1 micron.

27. The brazing product of claim 1, further comprising a barrier coating to temporarily restrict diffusion of silicon from the liquid-forming layer into the substrate, wherein the barrier coating comprises one or more elements selected from the group consisting of nickel, titanium, tantalum, copper, niobium, tin, lead, bismuth and aluminum, and wherein the barrier coating is located between the substrate and the liquid-forming layer.

28. The brazing product of claim 1, wherein the braze-promoting layer has a thickness of no more than 25 percent of a thickness of the liquid-forming layer.

29. The brazing product of claim 1, wherein the braze-promoting layer comprises no more than 25 percent by weight of the filler metal-forming composition.

30. The brazing product of claim 1, wherein the silicon content of the filler metal-forming composition as a whole is not less than about 20 percent by weight.

* * * * *